(12) United States Patent
Avian et al.

(10) Patent No.: US 9,746,075 B2
(45) Date of Patent: Aug. 29, 2017

(54) METHOD FOR REGULATING THE CONTROL OF AN ELECTRICAL WASTEGATE ACTUATOR BY MEASURING THE CURRENT PASSING THROUGH THE ELECTRICAL ACTUATOR

(71) Applicants: CONTINENTAL AUTOMOTIVE FRANCE, Toulouse (FR); CONTINENTAL AUTOMOTIVE GmbH, Hannover (DE)

(72) Inventors: Philippe Avian, Goyrans (FR); Jacques Rocher, Saint Orens de Gameville (FR); Laurent Cuvelier, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 264 days.

(21) Appl. No.: 14/555,772

(22) Filed: Nov. 28, 2014

(65) Prior Publication Data
US 2015/0160661 A1  Jun. 11, 2015

(30) Foreign Application Priority Data
Dec. 5, 2013 (FR) .................................... 13 62126

(51) Int. Cl.
*G05D 7/06* (2006.01)
*F16H 61/28* (2006.01)
(Continued)

(52) U.S. Cl.
CPC ....... *F16H 61/2807* (2013.01); *F02B 37/186* (2013.01); *F02B 37/18* (2013.01);
(Continued)

(58) Field of Classification Search
CPC ... F16H 61/2807; F02B 37/186; G05B 19/19; G05B 19/416
(Continued)

(56) References Cited

U.S. PATENT DOCUMENTS 2,760,050 A    8/1956 Porsche
5,083,074 A *  1/1992 Suzuki ................ G05B 19/416
                                                   314/69

(Continued)

FOREIGN PATENT DOCUMENTS

CN    102135040 A    7/2011
CN    102828863 A    12/2012
(Continued)

OTHER PUBLICATIONS

French Search Report, dated Dec. 12, 2013, from corresponding FR application.

*Primary Examiner* — Mohammad Ali
*Assistant Examiner* — Joshua Sanders
(74) *Attorney, Agent, or Firm* — Young & Thompson

(57) ABSTRACT

Method for regulating the control of an electrical wastegate actuator controlled via an H bridge to permit displacement of the wastegate in its closure and opening directions according to whether the current passes through the actuator in one or opposite direction, includes:
  determining a set position which the wastegate has to reach, and an activation time of the actuator defining a monitoring time;
  applying a control signal to the actuator to displace the valve into the set position;
  measuring the current passing through the H bridge and applying a correction factor to the current to obtain the motor torque;
  obtaining the displacement speed of the wastegate by integration of the motor torque;
  (Continued)

obtaining the position reached by the wastegate at the end of the monitoring time by integration of the speed;

comparing the position reached with the set position; and repeating the method until the set position is reached.

6 Claims, 1 Drawing Sheet

(51) Int. Cl.
*F02D 41/00* (2006.01)
*F02B 37/18* (2006.01)

(52) U.S. Cl.
CPC .. *F02D 41/0007* (2013.01); *F02D 2200/0406* (2013.01); *Y02T 10/144* (2013.01)

(58) Field of Classification Search
USPC .... 123/399, 568.21, 568.23, 568.24, 399.25, 123/399.26, 399.27, 559.2, 564; 251/282, 251/129.04, 129.11, 129.12, 298, 299, 251/300; 700/282, 289; 137/487.5
See application file for complete search history.

(56) References Cited

U.S. PATENT DOCUMENTS

| | | | |
|---|---|---|---|
| 6,012,289 A | 1/2000 | Deckard et al. | |
| 7,902,785 B2 * | 3/2011 | Denk | G05B 19/19 318/560 |
| 2005/0092949 A1 | 5/2005 | Wilhelm | |
| 2005/0172627 A1 | 8/2005 | Baize et al. | |
| 2009/0217661 A1 | 9/2009 | Gruel | |
| 2010/0263641 A1 | 10/2010 | Hagelstein et al. | |
| 2011/0023481 A1 | 2/2011 | Baeuerle | |
| 2011/0180047 A1 | 7/2011 | Yamakawa et al. | |
| 2012/0317974 A1 | 12/2012 | Rollinger | |
| 2013/0118161 A1 | 5/2013 | Ehrmann et al. | |
| 2013/0255250 A1 | 10/2013 | Naunheim et al. | |
| 2013/0291539 A1 | 11/2013 | Koch et al. | |

FOREIGN PATENT DOCUMENTS

| | | |
|---|---|---|
| DE | 102007051505 A1 | 4/2009 |
| DE | 102008051817 A1 | 4/2010 |
| DE | 102008051818 A1 | 4/2010 |
| DE | 102010031500 A1 | 1/2012 |
| EP | 2439392 A1 | 4/2012 |
| EP | 2439393 A1 | 4/2012 |
| EP | 2472122 A2 | 7/2012 |
| EP | 2489853 A1 | 8/2012 |
| FR | 2987448 A1 | 8/2013 |
| GB | 2311556 A | 10/1997 |
| GB | 2493748 A | 2/2013 |
| JP | 11218031 A | 8/1999 |
| WO | 9953183 A1 | 10/1999 |
| WO | 2012031930 A1 | 3/2012 |
| WO | 2012095383 A1 | 7/2012 |

* cited by examiner

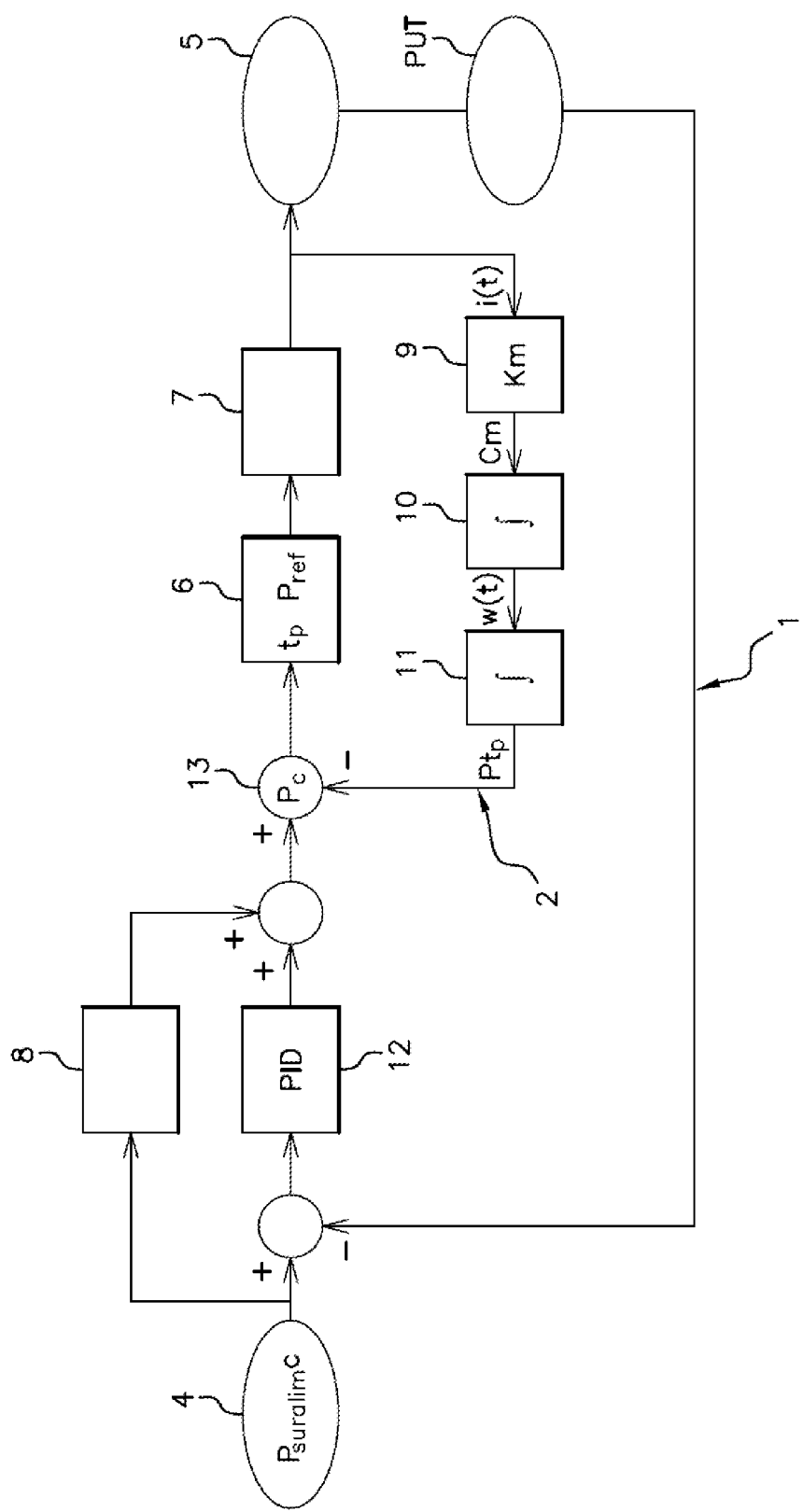

METHOD FOR REGULATING THE CONTROL OF AN ELECTRICAL WASTEGATE ACTUATOR BY MEASURING THE CURRENT PASSING THROUGH THE ELECTRICAL ACTUATOR

BACKGROUND OF THE INVENTION

Field of the Invention

The present invention relates to a method for regulating the control of an electrical actuator of a valve permitting the exhaust gases of an internal combustion engine to be diverted from the fluid supply circuit of a turbine of a turbocharger designed to compress the fresh gases admitted into the air intake circuit of said internal combustion engine.

Description of the Related Art

A valve or obturator for diverting the exhaust gases of a turbocharger turbine is also commonly called a "wastegate" by the person skilled in the art, the two terms being used equally in the remainder of the document. When an electrical actuator of the electric motor type controls such a valve, an H bridge is present in the circuit for controlling the rotation of the electric motor to permit said electric motor to rotate in both rotational directions, in the forward or reverse directions, to open or close the valve.

"Valve" is understood here as any mobile obturator installed in an exhaust pipe or channel and permitting the circulation of a fluid in said pipe or said channel to be regulated, for example of the standard valve type, flap valve type, butterfly valve type, etc.

In order to determine the quantity of exhaust gas which passes through the turbine, it is necessary to ascertain the position of the wastegate indicating the quantity of diverted gas or that passing through the turbine by calibration. Thus, a law for monitoring the flow rate passing through the wastegate is determined for each position thereof for a given engine as a function of the speed of said engine and the atmospheric pressure, resulting in a table of charge air pressures, as a function of the engine speed, the external pressure and the open position of the wastegate. This table of pressures is used by the ECU (Engine Control Unit) of the engine to regulate the turbocharger.

The prior art teaches a method for obtaining/monitoring the position of the wastegate by analog input by means of a position sensor of said wastegate, providing its position in the range of positions thereof between the complete closure and opening of the valve, thus permitting information to be obtained about the quantity of diverted gas and consequently the power/flow rate delivered by the turbocharger. Such a position sensor generally operates on the widely used principle of replicating the position which provides information about the position of the valve by means of a resistive measurement via a variable electrical resistance as a function of the position of the valve. This method of replicating the position is used to provide monitoring of the position of the valve during the regulating phase of the supercharging pressure. The replication of the position is also used to ensure a means of protecting the electric motor for controlling the valve when mechanically stopped, where the permanent current in the motor could then result in the damage thereof.

As indicated above, the engine control unit of the engine needs to ascertain the position of the wastegate to regulate the turbocharger, this regulation comprising a step of transmitting to the electrical actuator of this wastegate an instruction for the position to be reached by said wastegate from a known position.

A supercharging pressure sensor called a PUT (Pressure Upstream Throttle) sensor, is arranged in the known manner in the intake circuit upstream of the butterfly valve for regulating air admitted by negative pressure in the cylinders, and delivers information at this location to the electronic control unit of the engine about the value of the pressure of the air admitted to the engine, corresponding to the supercharging pressure.

A drawback with the system for monitoring the position of the wastegate as disclosed above is that it requires the use of three connection pins on the ECU, whilst the current trend is to minimize the number of such connections. Moreover, the position sensor represents a considerable cost and a potential source of malfunction, in particular, due to wear or to defective electrical contacts.

SUMMARY OF THE INVENTION

The present invention proposes an alternative solution to the use of a position sensor of the wastegate, omitting such a sensor. More specifically, it consists of a method for regulating the control of an electrical actuator of a valve permitting the exhaust gases of an internal combustion engine to be diverted from the fluid supply circuit of a turbine of a turbocharger designed to compress the fresh gases admitted into the air intake circuit of said internal combustion engine, said electrical actuator being controlled by means of an H bridge in order to permit a displacement of the valve in the direction of its closure and in the direction of its opening according to whether the current passes through the electrical actuator in one direction or in the opposing direction, characterized in that the method comprises the following steps:

step 1: determining a set position which said valve has to reach from a known position thereof and an activation time of said electrical actuator of the valve defining a monitoring time, step 2: applying a control signal to the electrical actuator of said valve via said H bridge during said monitoring time to displace the valve into said set position, step 3: measuring the electrical current which passes through the H bridge during the monitoring time and applying a correction factor to said measured electrical current so as to obtain the motor torque delivered by the electrical actuator during said monitoring time, step 4: obtaining the speed of displacement of the valve during said monitoring time by the integration of said motor torque over said monitoring time, step 5: obtaining the position reached by the valve at the end of the monitoring time by the integration of the speed over said monitoring time, step 6: comparing said position which has been reached with said set position, step 7: repeating the method from step 2 until said set position is reached.

The present invention permits the position sensor of the prior art of the wastegate to be replaced by a method which uses the measurement or readout of the current passing through the H bridge of the control circuit of the electrical actuator of the wastegate after having determined that said current is representative of the torque delivered by the actuator.

The set position in step 1 is provided by the engine control unit within the context of the control of the turbocharger. The monitoring time is also provided, for example, by the engine control unit and is adapted as a function of the activation time of the electrical actuator used for the control of the turbocharger such that this monitoring activation time is short relative to the total activation time of the actuator to reach a set position from a given position.

In step 2, the control signal is transmitted by the engine control unit in the known manner to activate the actuator via the H bridge.

The torque delivered by the electrical actuator in step 3 is determined from the current passing through the H bridge, for example in the following manner for an actuator of the electrical motor type:

$$Jm\frac{dw}{dt} = Cm - Cr \cong Kmi(t) \quad \text{Equation (1)}$$

where:
Jm=moment of inertia of the electric motor;
w=rotational speed of the electric motor;
Cm=electric motor torque;
Cr=resistant torque, which might be composed of the frictional forces and the compressive force of a spring; for reasons of simplicity, for the purpose of the description, in a first approximation, it will be assumed that said resistant torque is negligible relative to the motor torque Cm;
Km=motor torque constant;
i(t)=current passing through the H bridge (and thus the electric motor) during the application time t of the control signal of the motor.

The equation (1) thus becomes:

$$\frac{dw}{dt} \cong \frac{Km}{Jm}i(t)$$

The speed of displacement of the valve during the activation time of the electrical actuator, in step 4, is obtained by the integration of said motor torque over said activation time in the following manner:
Where:

$$w(t) = \frac{Km}{Jm}\int_0^{t_p} i(t)$$

$t_p$=activation time of the electric motor, corresponding here to the monitoring time $t_p$.

The position reached by the valve at the end of the activation time, by the integration of the speed over said activation time, is obtained at step 5 in the following manner:

$Pt_p = \int_0^{t_p} w(t)$

Where:
$Pt_p$=position reached by the valve at the end of the monitoring activation time $t_p$.

The method according to the invention may be easily carried out by means of software which is implemented, for example, in the engine control unit and the measurement or readout of the current is carried out in all of the known ways, for example supplied by the electronic components provided in the conventional manner in specific H bridges or by the readout of the current in a shunt, or even directly by known tools for measuring current connected to the conventional control circuit of the electrical actuator of the wastegate. Preferably, the method according to the invention will function with a tool for measuring current which is already present on the control circuit of the actuator, for example in order to protect the H bridge in order to reduce the cost of implementing the present invention. The dual integration of the information about the current makes it possible to estimate the position of the wastegate and thus permits the position of said valve to be regulated, for example as described below according to an example of a feedback loop, without using a position sensor of the valve.

According to an advantageous feature, the displacement stops of said valve, in the extreme open and closed positions, are ascertained by means of a detector of the current thresholds passing through the H bridge, respectively for one direction of displacement and the opposing direction of displacement of the electrical actuator, in order to ascertain at least one initial reference position of the valve to establish said known position thereof.

This feature makes it possible to provide an initial reference position of the valve, for example as soon as the engine is started up, and also to ascertain the limits of displacement of the valve, in addition to the displacement time of the electrical actuator from one extreme position of the valve to the other. Ascertaining the displacement stops of the valve makes it possible to obtain an initial indicator of the position of the valve from which a specific set position may be reached.

According to an advantageous feature, an unwanted blockage of the valve between said extreme closed and open positions, the extreme open positions being excluded, is detected by means of said detector of the current thresholds passing through the H bridge.

This characteristic provides the method with a safety feature of the electrical actuator in the case of the blockage of the valve between its operating limit positions, for example by cutting off the electrical supply to the actuator in such a case.

According to an advantageous feature, the method according to the invention further comprises a step consisting of using the information about the value of the air pressure present in the air intake duct of the internal combustion engine provided by an air pressure sensor arranged upstream of a butterfly valve for controlling the flow rate of air admitted into said engine, in order to verify if said set position corresponds to the supercharging pressure required by an electronic control unit of said engine.

Further features and advantages will appear from reading the following embodiment of a regulating method according to the invention, with the accompanying drawings, given by way of non-limiting example.

BRIEF DESCRIPTION OF THE DRAWING

The only FIGURE shows a feedback diagram illustrating the implementation of an example of the method according to the invention for regulating the control of an electrical actuator of a wastegate arranged in the known manner in an exhaust circuit of an internal combustion engine of a vehicle, for example an automotive vehicle (not shown).

DETAILED DESCRIPTION OF THE PREFERRED EMBODIMENT

The diagram of the only FIGURE defines the operation of a system for regulating the control of an electrical actuator 7 of a valve (not shown) permitting the exhaust gases of an internal combustion engine (not shown) to be diverted from the fluid supply circuit of a turbine of a turbocharger designed to compress the fresh gases admitted into the air intake circuit of the internal combustion engine. The electrical actuator 7 is controlled in the known manner by means of an H bridge (not shown) in order to permit a displacement of the valve in the direction of its closure and in the direction of its opening, according to which the current passes through the electrical actuator 7 in one direction or in the opposing direction. The system shown comprises two feedback loops 1, 2 as disclosed below.

The set supercharging pressure $P_{suralim}C$ is present at the inlet 4 of the system, said set supercharging pressure being required in the known manner by the electronic control unit of the engine (not shown, hereinafter called ECU) as a function of a control of the engine torque on the part of the driver, and in particular further parameters of the heat engine, such as the speed, etc.

The assembly consisting of the turbocharger and heat engine or internal combustion engine is present at the outlet 5 of the system, the turbocharger acting on the supercharging pressure of the heat engine.

The signal of the measured supercharging pressure of the heat engine is provided by a PUT pressure sensor in the known manner, said sensor being arranged upstream of a butterfly valve for controlling the flow rate of air admitted into the heat engine. The signal of the measured supercharging pressure of the heat engine is advantageously used in the method shown, and permits in the known manner to form the first feedback loop 1 linking this pressure information with the inlet 4 of the system in order to monitor that the value of the supercharging pressure provided by the PUT sensor in a position reached by the valve, for example the set position $P_c$ as explained hereinafter, corresponds to the set supercharging pressure $P_{suralim}c$ required by the ECU as a result of a requirement for a given torque made by the driver of the vehicle by means of the accelerator pedal, for example. To this end, a regulator 12, for example a PID regulator as shown, is inserted into the loop 1 to regulate the supercharging pressure.

In the known manner, a model 8 of the turbocharger and the wastegate permits, by estimation, an open position of the wastegate to correspond to a given supercharging pressure, for example a set open position $P_c$ of the wastegate for a set supercharging pressure $P_{suralim}c$ required by the ECU for a given engine, taking into account in particular the speed of the engine.

The second feedback loop 2 is the loop which essentially implements an example of the method according to the invention and will now be described below by means of the only FIGURE. As shown in the FIGURE, a set position $P_c$ of the valve or wastegate is located at the inlet of the loop 2, originating from the outlet of the regulator 12 in the example, the outlet of the loop 2 being connected to the outlet 5 of the feedback loop 1.

According to the method according to the invention, a first step (step 1), therefore, consists in determining a set position $P_c$, for example a position estimated by means of a model 8 cited above which the valve has to reach from a known position $P_{ref}$ thereof. The current known position $P_{ref}$ of the valve is advantageously established from a known reference position of the ECU, for example by ascertaining the limits of displacement of the valve as will be explained below. This set position $P_c$ constitutes the inlet 13 of the feedback loop 2, as shown in the FIGURE. Moreover, an activation time of the electrical actuator 7 of the valve is defined as corresponding to a monitoring time $t_p$ thereof required to displace the valve to the set position $P_c$ by one displacement increment. The monitoring activation time $t_p$ defines the monitoring period of the loop 2 and is determined from the characterization of the system.

According to the method according to the invention, a second step (step 2) consists in the information about the position $P_c$ which the valve has to reach being transmitted to an electronic control unit 6 of the electrical actuator 7 of the valve, in the example an electrical motor, via an H bridge (not shown) which activates the electrical motor so that the valve reaches the set position $P_c$, to this end applying a control signal onto the actuator 7 until the set position $P_c$ is reached during an activation time, for example a multiple of the monitoring time $t_p$. The electronic control unit 6 delivers in the known manner a control signal of the PWM type (Pulse Width Modulation). The valve or wastegate is, for example, a rotary valve (not shown) placed across an exhaust pipe (not shown) the rotary axle thereof being actuated by the electrical motor 7.

According to the method according to the invention, a third step (step 3) consists in the electrical current i(t) which passes through the H bridge being measured during the monitoring time $t_p$ and a correction factor Km 9 being applied to the measured electrical current i(t) to obtain the motor torque Cm delivered by the electrical actuator during the monitoring time $t_p$, according to the diagram of the loop 2 shown in the FIGURE. The correction factor Km may be obtained by calibration and is assigned to a given electrical actuator 7. This third measuring step 3 is preferably implemented by means of electronic components provided in the conventional manner on specific H bridges and controlled by the ECU.

According to the method according to the invention, a fourth step (step 4) consists in the speed of displacement w(t) of the valve being obtained during the monitoring time $t_p$, by the integration 10 of the motor torque Cm over the monitoring time $t_p$, i.e. by the integration of the current i(t) over the monitoring time $t_p$, as explained above and shown on the loop 2 in the FIGURE. This fourth step 4 may be obtained by means of an integrator placed, for example, in the ECU according to different integration methods of choice, for example the trapezoidal method, to be adapted as a function of the control signal of the actuator and, in particular, the sampling period of the PWM signal.

According to the method according to the invention, a fifth step (step 5) consists in the position reached $Pt_p$ by the valve at the end of the monitoring time $t_p$ being obtained by the integration 11 of the speed w(t) of displacement of the valve over the monitoring time $t_p$, as shown on the loop 2 in the FIGURE. In the same manner as the fourth step, this fifth step 5 may be obtained by means of an integrator positioned for example in the ECU, using for example the trapezoidal method.

Once the position reached $Pt_p$ by the valve is known at the end of the monitoring time $t_p$, a sixth step (step 6) of the method consists in comparing this position reached $Pt_p$, with the set position $P_c$. This sixth step 6 is, for example, implemented by means of a comparator integrated in the ECU.

Subsequently, the method consists of a seventh step (step 7) to reiterate the steps 2 to 6 of the method, disclosed above, according to the feedback loop 2, until the valve reaches the set position $P_c$.

Advantageously, the displacement stops of the valve, in the extreme open and closed positions, are ascertained by means of a detector of current thresholds passing through the H Bridge, respectively for one direction of displacement and the opposing direction of displacement of the electrical actuator 7, in order to ascertain at least one initial reference position of the valve to establish the known position $P_{ref}$ thereof, for example that in which the valve is located at the moment where the ECU transmits the set position $P_c$ to be reached. The open or closed stop positions of the valve could be determined either by reading out the increase in current or by information obtained about the current limit reached. The information about the current limit reached is generally always integrated in the electronic components of an H bridge of the known type. These stop positions could advantageously serve to reset the parameters of the dual integration of the current/speed/position.

In the supercharging operating zone imposed, namely in the intermediate position of the valve, i.e. in the activation zone for regulating the supercharging of the turbocharger, the pressure regulating loop 1 based on the measurement of the supercharging pressure by means of the PUT sensor will permit the position of the valve to be reset in order to establish the set supercharging pressure $P_{suralim}c$.

Preferably, an unwanted blockage of the valve between its extreme closed and open positions, the extreme open positions being excluded, will be detected by means of the detector of current thresholds passing through the H bridge which is used for ascertaining the positions of said extreme closed and open positions. This safety step will advantageously be integrated in the disclosed method in order, for example, to transmit a signal of the malfunction of the wastegate in the case of a blockage in its operating range between its extreme positions.

The invention claimed is:

1. A method for regulating the control of an electrical actuator of a valve permitting the exhaust gases of an internal combustion engine to be diverted from a fluid supply circuit of a turbine of a turbocharger designed to compress the fresh gases admitted into an air intake circuit of said internal combustion engine, said electrical actuator being controlled by means of an H bridge in order to permit a displacement of the valve in the direction of its closure and in the direction of its opening according to whether the current passes through the electrical actuator in one direction or in the opposing direction, characterized in that the method comprises the following steps:

step 1: determining a set position ($P_c$) which said valve has to reach from a known position ($P_{ref}$) thereof and an activation time of said electrical actuator of the valve defining a monitoring time ($t_p$), step 2: applying a control signal to the electrical actuator of said valve via said H bridge during said monitoring time ($t_p$) to displace the valve into said set position, step 3: measuring the electrical current [i(t)] which passes through the H bridge during the monitoring time ($t_p$) and applying a correction factor (Km) to said measured electrical current [i(t)] so as to obtain the motor torque (Cm) delivered by the electrical actuator during said monitoring time ($t_p$), step 4: obtaining a speed [w(t)] of displacement of the valve during said monitoring time ($t_p$) by the integration of said motor torque (Cm) over said monitoring time ($t_p$), step 5: obtaining a position reached ($Pt_p$) by the valve at the end of the monitoring time ($t_p$) by the integration of the speed [w(t)] over said monitoring time ($t_p$), step 6: comparing said position which has been reached ($Pt_p$) with said set position ($P_c$), step 7: repeating the method from step 2 until said set position ($P_c$) is reached.

2. The method as claimed in claim 1, in which displacement stops of said valve, in the extreme open and closed positions, are ascertained by means of a detector of current thresholds passing through the H bridge, respectively for one direction of displacement and the opposing direction of displacement of the electrical actuator, in order to ascertain at least one initial reference position of the valve to establish said known position ($P_{ref}$) thereof.

3. The method as claimed in claim 2, in which an unwanted blockage of the valve between said extreme closed and open positions, the extreme open positions being excluded, is detected by means of said detector of the current thresholds passing through the H bridge.

4. The method as claimed in claim 1, further comprising a step consisting of using the information about the value of the air pressure present in the air intake duct of the internal combustion engine provided by an air pressure sensor (PUT) arranged upstream of a butterfly valve for controlling the flow rate of air admitted into said engine, in order to verify if said set position ($P_c$) corresponds to the supercharging pressure ($P_{suralim}C$) required by an engine control unit of said engine.

5. The method as claimed in claim 2, further comprising a step consisting of using the information about the value of the air pressure present in the air intake duct of the internal combustion engine provided by an air pressure sensor (PUT) arranged upstream of a butterfly valve for controlling the flow rate of air admitted into said engine, in order to verify if said set position ($P_c$) corresponds to the supercharging pressure ($P_{suralim}C$) required by an engine control unit of said engine.

6. The method as claimed in claim 3, further comprising a step consisting of using the information about the value of the air pressure present in the air intake duct of the internal combustion engine provided by an air pressure sensor (PUT) arranged upstream of a butterfly valve for controlling the flow rate of air admitted into said engine, in order to verify if said set position ($P_c$) corresponds to the supercharging pressure ($P_{suralim}C$) required by an engine control unit of said engine.

* * * * *